Feb. 13, 1923. Re. 15,542

W. C. THIELL

AUTOMOBILE LOCK

Original Filed Aug. 29, 1922

Inventor
William C. Thiell

By Cushman, Bryant & Welch
Attorneys

Reissued Feb. 13, 1923. Re. 15,542

UNITED STATES PATENT OFFICE.

WILLIAM C. THIELL, OF BALTIMORE, MARYLAND.

AUTOMOBILE LOCK.

Original No. 1,427,654, dated August 29, 1922, Serial No. 395,818, filed July 13, 1920. Application for reissue filed December 12, 1922. Serial No. 606,503.

*To all whom it may concern:*

Be it known that I, WILLIAM C. THIELL, a citizen of the United States, residing at Baltimore, in the county of Baltimore City and State of Maryland, have invented new and useful Improvements in Automobile Locks, of which the following is a specification.

This invention relates to improvements in automobile locks and has for its object to provide a cheap, simple and efficient device to lock the machine so that it cannot be started and also to lock the machine so it cannot be towed away.

The invention consists of the novel construction and arrangement of the parts hereinafter more fully set forth in the specification and pointed out in detail in the appended claims.

In the accompanying drawings:—

Figure 1:
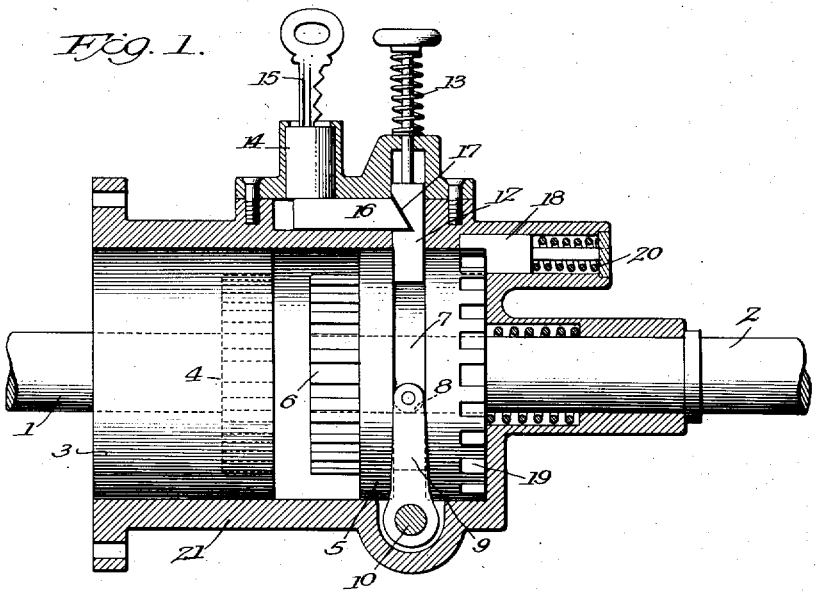
Figure 1 is a side elevation of my invention, the clutch casing being shown in section.
Figure 2:
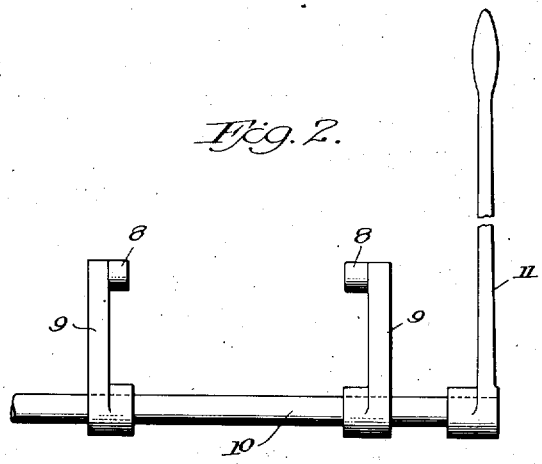
Figure 2 is a detail view of the lever and shaft for operating the slidable clutch face.

Referring to the accompanying drawings forming part of this specification and in which like reference numerals designate like parts throughout the several views thereof, 21 designates the clutch casing through which the driver shaft projects. The said driver shaft is composed of two sections 1 and 2 the section 1 being connected with the engine in the front of the machine and the section 2 being connected with the rear of the machine. The front section 1 is provided with a clutch face 3 which is provided with internal gears 4 and is fast on the end of the section 1 of said drive shaft. The other face 5 of the clutch is slidably mounted on the end of the section 2 of the drive shaft and is provided with external teeth 6 adapted to mesh with the internal teeth on the face 3 of the clutch. The said clutch 5 is provided with an annular groove 7 into which is fitted the rollers 8 on the arms 9, the latter being mounted on the shaft 10 which is operated by the lever 11 for moving the slidable face 5 into and out of gear with the clutch face 3. The case 21 is provided with a bolt 12 adapted to be forced into the annular groove 7 of the clutch face 5, the said bolt 12 being held normally out of engagement with said slot 7 by the spring 13. The casing 21 is also provided with a lock 14 operated by the key 15, the latch 16 of said lock being bevelled on one end and adapted to be set in the bevelled cut-out 17 in the side of the bolt 12. When the device is in the unlocked position the bolt 12 is out of engagement with the groove 7 and the face 5 can be moved back and forth on the section 2 of the drive shaft by operating the lever 11. When it is desired to lock the machine the clutch face 5 is drawn back out of engagement with the clutch face 3 and the bolt 12, is then pushed down against the action of the spring 13 into the groove 7 and the latch 16 springs into the recess 17 in which position the bolt will be held and the clutch face 5 locked against movement along the section 2 of the drive-shaft in which position the machine cannot be operated until the latch 16 is withdrawn from the recess 17 by means of key 15. The rear end of the case 21 is provided with a sliding bolt 18 adapted to engage one of the cut-outs 19 on the rear of the clutch face 5, the said bolt 18 being held in the normal position by the coil spring 20. When the clutch face 5 is drawn out of engagement with the clutch face 3 the pin 18 will enter one of the cut-outs 19 and prevent the rear section 2 of the drive shaft from being turned which locks the rear wheels of the machine and prevents it from being towed away. As the clutch face 5 is moved forward it will not engage the face 3 until the rear end has completely passed the end of the bolt 18. Should the space on the rear of the clutch face 5 between the cut-outs 19 strike the end of the bolt 18 the latter will be pushed back against the action of the coil spring 20 and any attempt to move the car will cause sufficient revolution of the section 2 of the drive shaft to allow the said bolt to spring into one of the cut-outs 19.

It will thus be seen that by the use of my invention the machine can be locked or so operated so that it cannot be started and that the rear of the machine is so locked that it cannot be towed away.

Having thus described my invention what I claim is:

1. An automobile lock comprising a clutch casing, a drive shaft comprising two sections each projecting into said clutch casing, a clutch face fixed to the end of one of the sections of said drive shaft and having internal gear teeth, a clutch face slidably mounted on the other section of said drive shaft and having an annular recess therein and external gear teeth, a shaft mounted in said casing at right angles to the drive shaft and having two arms projecting therefrom, a roller on the end of each of said arms and projecting into said recess in the slidable clutch face, a lever to operate said last named shaft to throw the slidable clutch face into or out of engagement with the other clutch face, a bolt adapted to project into the recess in the slidable clutch face, a spring to hold the said bolt normally out of engagement with the slidable clutch face, and a lock to hold the bolt in the slidable clutch face.

2. An automobile lock comprising a casing, power transmission elements in said casing comprising two clutch members, one of said clutch members being axially slidable for engagement and disengagement with the other member, means operable from the exterior of the casing for actuating said slidable clutch member into and out of engagement with the other member, locking means for engaging the slidable clutch member when the same is disengaged from the other clutch member to hold the same against sliding movement, and yielding means automatically operable upon separation of said clutch members to lock the slidable clutch member against rotation.

3. An automobile lock comprising a casing, power transmission elements in said casing comprising two clutch members, one of said members being axially shiftable for engagement and disengagement with the other member; means for directly engaging said shiftable member for locking the same in disengaged relation with the other member, and yielding means adapted automatically to engage said shiftable member when separated from the other member to lock the shiftable member against rotation.

4. An automobile lock comprising a casing, power transmission elements in said casing comprising two clutch members, one of said members being axially shiftable for engagement and disengagement with the other member; means for directly engaging said shiftable member for locking the same in disengaged relation with the other member, and means yieldable axially of said member and adapted automatically to engage said shiftable member when separated from the other member to lock the shiftable member against rotation.

5. An automobile lock comprising a clutch casing, a drive shaft formed of two sections projecting into said casing, a clutch member fixed to the end of one of the sections of the drive shaft, a complementary clutch member slidably mounted on the other section of said drive shaft, means for actuating said slidable clutch member into and out of engagement with said first mentioned clutch member, locking means for directly engaging that slidable clutch member when separated from said other clutch member to hold the slidable clutch member against sliding movement, and means operable automatically upon the separation of said clutch member to directly engage and to lock said slidable clutch member against rotative movement, said last mentioned means being yieldable axially of said slidable clutch member.

6. An automobile lock comprising a casing, a drive shaft having two sections projecting into said casing, a clutch member fixed to one of said sections, a complementary clutch member slidably mounted on the other section, means for moving said slidable clutch member into and out of engagement with the other clutch member, a locking bolt adapted directly to engage the slidable clutch member when the same is separated from the other clutch member to hold it against sliding movement, and a bolt yieldable in the direction of movement of said slidable clutch member adapted directly to engage said clutch member automatically upon separation of the clutch members and to hold the slidable clutch member against rotation.

7. An automobile lock comprising a casing, a drive shaft having two sections projecting into said casing, a clutch member fixed to one of said sections, a complementary clutch member slidably mounted on the other section, means for moving said slidable clutch member into and out of engagement with the other clutch member, a locking bolt adapted directly to engage the slidable clutch member when the same is separated from the other clutch member to hold it against sliding movement, and a bolt yieldable in the direction of movement of said slidable clutch member adapted directly to engage the same automatically upon separation of the clutch members and to hold the slidable clutch member against rotation, said slidable clutch member having external recesses adapted to receive said last mentioned locking means.

8. An automobile lock comprising a clutch casing, a drive shaft comprising two sections each projecting into said clutch casing, a clutch member fixed to the end of one of the sections of said drive shaft, a clutch member slidably mounted on the other section of said drive shaft and having external recesses, a shaft mounted in said casing and having an arm projecting therefrom engaging said slidable clutch member, a lever to operate said last named shaft to throw the slidable clutch member into or out of engagement with the other clutch member, a bolt adapted to directly engage said slidable clutch member to hold the same against sliding movement when separated from the other clutch member, and yielding means adapted to enter one of the external recesses on said slidable clutch member automatically when the same is disengaged from the other clutch and to hold the same against rotation.

9. An automobile lock comprising a clutch casing, a drive shaft comprising two sections each projecting into said clutch casing, a clutch member fixed to the end of one of the sections of said drive shaft and having internal gear teeth, a clutch member slidably mounted on the other section of said drive shaft, and having external recesses, a shaft mounted in said casing and having an arm projecting therefrom engaging said slidable clutch member, a lever to operate said last named shaft to throw the slidable clutch member into or out of engagement with the other clutch member, a bolt adapted to directly engage said slidable clutch member to hold the same against slidable movement when separated from the other clutch member, and means yieldable in the direction of movement of said slidable clutch member and adapted to enter one of the external recesses on said slidable clutch member when separated from the other clutch member and to hold the same against rotation.

10. An automobile lock comprising a casing, a drive shaft formed of two sections, each projecting into said casing, a clutch member affixed to the end of one of the sections of said drive shaft, a clutch member slidably mounted on the other section of said drive shaft, said clutch members having complementary internal and external gear teeth, a rock shaft mounted in said casing at right angles to the drive shaft and having an arm projecting therefrom engaging said slidable clutch member a lever to operate said last named shaft to throw the slidable clutch member into or out of engagement with the other clutch member, a bolt adapted to project into the casing and to engage said slidable clutch member, a spring to hold said bolt normally out of engagement with the slidable clutch member, and a lock to hold the bolt in engagement with the slidable clutch member.

In testimony whereof I have hereunto set my hand.

WILLIAM C. THIELL.